United States Patent
Grün et al.

(10) Patent No.: US 11,578,671 B2
(45) Date of Patent: Feb. 14, 2023

(54) EXHAUST-GAS FLAP DEVICE

(71) Applicant: Purem GmbH, Neunkirchen (DE)

(72) Inventors: Matthias Grün, Altbach (DE); Markus Birgler, Wernau (DE); Markus Lory, Stuttgart (DE); Andreas Wacker, Plochingen (DE); Annika Zeumer, Wernau (DE); Ralph Schenk, Stuttgart (DE); Miljenko Novosel, Stuttgart (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 17/374,382

(22) Filed: Jul. 13, 2021

(65) Prior Publication Data

US 2022/0010738 A1  Jan. 13, 2022

(30) Foreign Application Priority Data

Jul. 13, 2020 (DE) ...................... 10 2020 118 355.0

(51) Int. Cl.
*F02D 9/10* (2006.01)
*F02D 9/04* (2006.01)
*F16K 47/00* (2006.01)

(52) U.S. Cl.
CPC ............ *F02D 9/1065* (2013.01); *F02D 9/04* (2013.01); *F02D 9/106* (2013.01); *F02D 9/1015* (2013.01); *F16K 47/012* (2021.08); *F01N 2240/36* (2013.01)

(58) Field of Classification Search
CPC .......... F02D 9/04; F02D 9/1015; F02D 9/106; F02D 9/1065; F01N 2240/36; F16K 47/012
See application file for complete search history.

(56) References Cited

U.S. PATENT DOCUMENTS

| 6,702,190 B1 * | 3/2004 | Nohl | B60H 1/025 165/41 |
|---|---|---|---|
| 10,508,741 B2 | 12/2019 | Schmitt et al. | |
| 2012/0007008 A1 | 1/2012 | Hegner et al. | |
| 2017/0241349 A1 * | 8/2017 | Greber | F16K 31/041 |
| 2019/0032607 A1 | 1/2019 | Stockinger et al. | |
| 2021/0246841 A1 * | 8/2021 | Edler | F02M 26/70 |

FOREIGN PATENT DOCUMENTS

| DE | 10 2010 055 382 A1 | 6/2012 |
|---|---|---|
| DE | 10 2016 114 704 A1 | 1/2018 |
| DE | 10 2017 117 289 A1 | 1/2019 |
| DE | 10 2018 204 431 A1 | 9/2019 |

\* cited by examiner

*Primary Examiner* — Audrey B. Walter
(74) *Attorney, Agent, or Firm* — Walter Ottesen, P.A.

(57) ABSTRACT

An exhaust-gas flap device, including for the exhaust-gas flow of an internal combustion engine, has a flap pipe and a flap plate that is supported in the interior of the flap pipe on a pivot shaft. The pivot shaft is rotatable about a pivot axis (A). The pivot shaft has first and second axial end regions and is supported rotatably on the flap pipe by respective first and second bearing assemblies. The pivot shaft is configured, in the first axial end region, for coupling to a drive element of a pivot drive. The pivot shaft is, in at least one of the axial end regions, in contact with vibration-damping material that is supported relative to the flap pipe.

20 Claims, 4 Drawing Sheets

EXHAUST-GAS FLAP DEVICE

CROSS REFERENCE TO RELATED APPLICATION

This application claims priority of German patent application no. 10 2020 118 355.0, filed Jul. 13, 2020, the entire content of which is incorporated herein by reference.

TECHNICAL FIELD

The present invention relates to an exhaust-gas flap device, in particular for the exhaust-gas flow of an internal combustion engine, comprising a flap pipe, a flap plate that is supported, in the interior of the flap pipe, on a pivot shaft that is rotatable about a pivot axis, the pivot shaft, in each of its two axial end regions, being supported rotatably by a bearing assembly on the flap pipe, and the pivot shaft being configured, in a first axial end region, for coupling to a drive element of a pivoting drive.

BACKGROUND

An exhaust-gas flap of the type is known from U.S. Pat. No. 10,508,741. In the case of this exhaust-gas flap, the pivot shaft, in its two axial end regions, is supported in respective bearing bushings arranged on the flap pipe, or pivot bearings arranged therein, so as to be pivotable about the pivot axis. During a pivoting of the pivot shaft caused by a pivoting drive, friction occurs in the region of the pivot bearings, which are generally in the form of plain or slide bearings. This friction can lead to an excitation of vibration of the pivot shaft and thus in particular also of the coupling unit that couples the pivot shaft to the pivoting drive. Such an excitation of vibration in the region of the pivot shaft or of the coupling unit can lead to the emission of noise that is perceptible in a vehicle.

SUMMARY

It is an object of the present invention to provide an exhaust-gas flap device in the case of which the emission of sound generated by vibrations in the region of the exhaust-gas flap device is suppressed.

According to the invention, the above is achieved by an exhaust-gas flap device, in particular for the exhaust-gas flow of an internal combustion engine, comprising a flap pipe, a flap plate that is supported, in the interior of the flap pipe, on a pivot shaft that is rotatable about a pivot axis, the pivot shaft, in each of its two axial end regions, being supported rotatably by a bearing assembly on the flap pipe, and the pivot shaft being configured, in a first axial end region, for coupling to a drive element of a pivoting drive.

The exhaust-gas flap device according to the invention is distinguished by the fact that the pivot shaft is, in at least one axial end region, in contact with vibration-damping material that is supported relative to the flap pipe.

Through the provision of vibration-damping material in the region of at least one axial end region of the pivot shaft, the occurrence of excitations of vibration in the region of the pivot shaft is substantially suppressed, and it is ensured that vibrations that possibly occur in the region of the exhaust-gas flap device, or vibrations transmitted to the exhaust-gas flap device, substantially do not lead to an emission of sound.

For pronounced damping behavior, it is proposed that the vibration-damping material comprises porous material.

Here, the use of open-pore material for the vibration-damping material has proven particularly suitable.

Since, in general, very high temperatures prevail in the region of such an exhaust-gas flap device, it is proposed that the vibration-damping material comprises wire material. In this way, a temperature-resistant construction is ensured.

Owing to a structure for the wire material that can be set in order to obtain a defined damping characteristic, it is particularly advantageous if the wire material comprises weft-knitted wire, warp-knitted wire, braided wire or woven wire. Such material can be provided with a defined structure, in particular a defined density of the wire material, on the one hand through the selection of the wire raw material and on the other hand through the setting of the production parameters. Alternatively, for the wire material, use may be made of irregular wire material, in which there is a substantially unordered profile of the wire sections that form the material. Such irregular wire material may be provided for example in the form of so-called wire wool.

In the case of a configuration which is easy to implement, it is proposed that the pivot shaft is, in its second axial end region, in contact with the vibration-damping material.

In order to allow both a defined mounting in the second axial end region of the pivot shaft, and contact between the pivot shaft and the vibration-damping material, in a structurally simple and compact configuration, it is proposed that the second bearing assembly, which is provided so as to be assigned to the second axial end region of the pivot shaft, comprises a second bearing bushing, which is provided on the flap pipe, and a second pivot bearing, preferably a slide bearing, which is arranged in the second bearing bushing and which bears the pivot shaft radially with respect to the pivot axis, and that the vibration-damping material is arranged axially between the pivot shaft and a bearing bushing base. Such an arrangement of the vibration-damping material is possible in particular if the second pivot bearing serves only for the radial mounting of the pivot shaft but not for the axial support of same.

For a defined interaction of the vibration-damping material with the pivot shaft, on the one hand, and defined positioning of the vibration-damping material in the bearing bushing, on the other hand, it is proposed that the vibration-damping material comprises a vibration-damping material contact region, which makes contact with the pivot shaft in the second axial end region at an axial face side, and a vibration-damping material fastening region, which is attached to the bearing bushing base.

In order to be able to attain as large an interaction surface area as possible between the vibration-damping material and the pivot shaft, the vibration-damping material contact region may have a pivot shaft engagement region which projects axially in the direction of the axial face side of the pivot shaft, and, on the axial face side of the pivot shaft, there may be provided a vibration-damping material receiving recess which receives the pivot shaft engagement region.

Here, the pivot shaft engagement region may for example be at least regionally of convexly domed or conical or frustoconical form, and the vibration-damping material receiving recess may be of complementary shape with respect to the pivot shaft engagement region. This means that, for example in the case of a convexly domed configuration of the pivot shaft engagement region, the vibration-damping material receiving recess is concavely domed with its complementary configuration. A corresponding situation also applies in the case of a conical or frustoconical configuration or in the case of some other geometrical shaping. For example, the pivot shaft engagement region could also be regionally of frustoconical form and configured with a convex curvature in its end region or tip region, wherein a complementary configuration is then provided in the case of the vibration-damping material receiving recess. For example, the pivot shaft engagement region may be of spherical-cap-shaped form.

In an alternative configuration, the assignment of receiving recess and engagement region to the recess presented above may be reversed. Accordingly, the vibration-damping material contact region may have a pivot shaft receiving recess, and, on the axial face side of the pivot shaft, there may be provided a vibration-damping material engagement region which engages into the pivot shaft receiving recess.

In the case of this arrangement, too, for the smoothest possible interaction, the vibration-damping material engagement region may be at least regionally of convexly domed or conical or frustoconical form, and the pivot shaft receiving recess may be of complementary shape with respect to the vibration-damping material engagement region. For example, it is also possible here for the vibration-damping material engagement region to be of spherical-cap-shaped form.

In order to spatially separate the functions of the fastening, on the one hand, and of the contact with the pivot shaft, on the other hand, it is proposed that the vibration-damping material fastening region is arranged so as to project radially outward with respect to the vibration-damping material contact region and/or so as to at least partially surround the vibration-damping material contact region radially to the outside. Alternatively or in addition, the vibration-damping material fastening region could be provided as an axial elongation of the vibration-damping material contact region, that is, substantially at the rear side thereof.

For stable support of the vibration-damping material on the bearing bushing base, the vibration-damping material fastening region may be of plate-like form.

A thermally stable fastening of the vibration-damping material can be achieved for example by virtue of the vibration-damping material fastening region being attached to the bearing bushing base by material cohesion, preferably welding.

For defined positioning of the pivot shaft with respect to the flap pipe, it is furthermore proposed that the first bearing assembly, which is provided so as to be assigned to the first axial end region of the pivot shaft, comprises a first bearing bushing, which is provided on the flap pipe, and a first pivot bearing, preferably a slide bearing, which is arranged in the first bearing bushing and which bears the pivot shaft radially and axially with respect to the pivot axis. Since the first pivot bearing provides not only the radial bearing function but also or exclusively the defined positioning of the pivot shaft in an axial direction, it is firstly the case that over determinacy in terms of the axial positioning is avoided, and secondly, the possibility of the axial interaction between the pivot shaft and the vibration-damping material is provided in the region of the second bearing assembly.

The exhaust-gas flap device advantageously furthermore comprises a pivoting drive for the pivot shaft, wherein the pivoting drive comprises a drive element which, by a coupling unit, is coupled to the pivot shaft for conjoint rotation about the pivot axis.

BRIEF DESCRIPTION OF THE DRAWINGS

The invention will now be described with reference to the drawings wherein.

DESCRIPTION OF THE PREFERRED EMBODIMENTS

Figure 1:
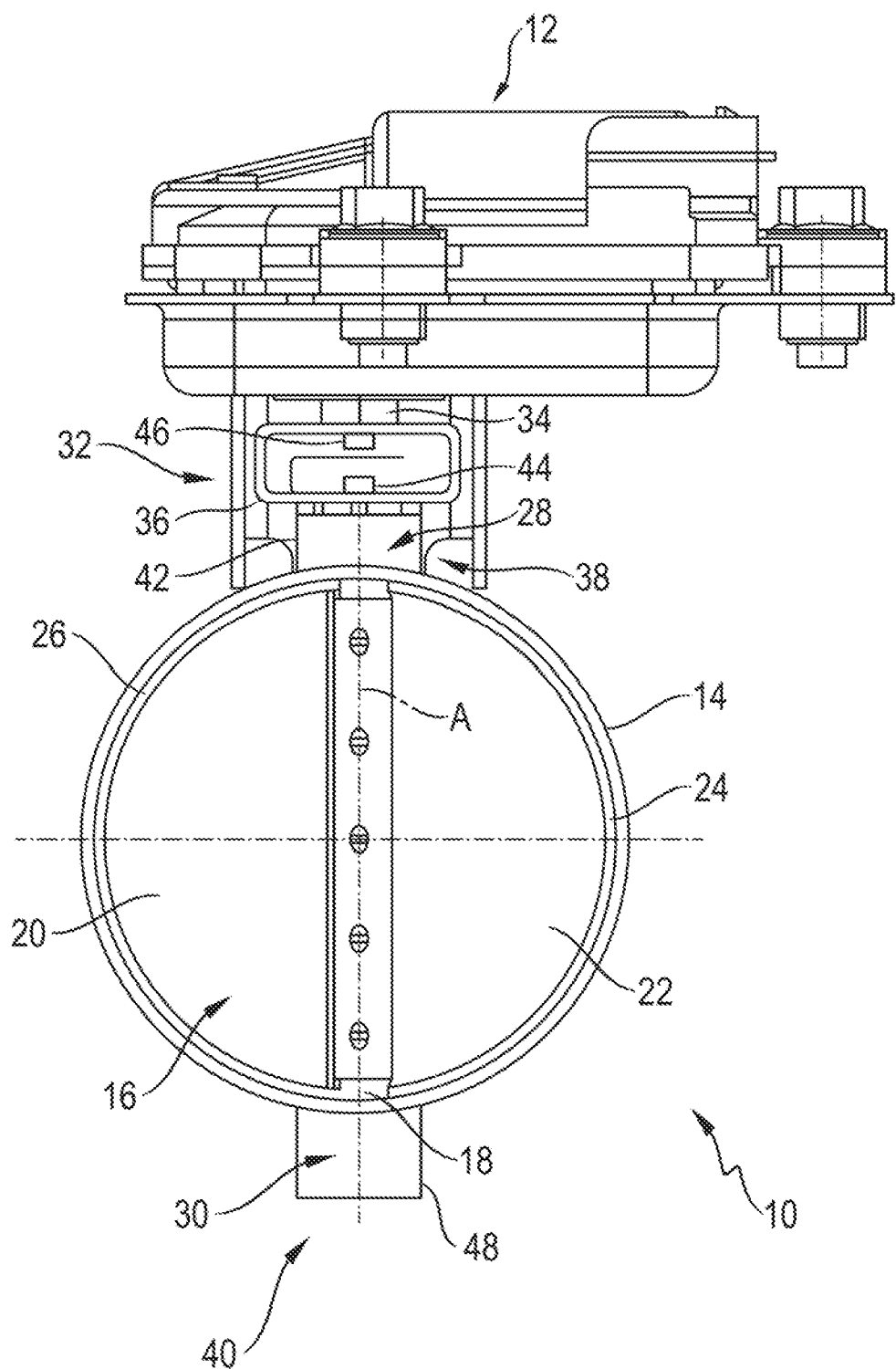
FIG. 1 shows an exhaust-gas flap device for an exhaust-gas system of an internal combustion engine.

FIG. 1 shows, in a side view, an exhaust-gas flap device which is denoted generally by 10 and which can be used for example in an exhaust-gas system of an internal combustion engine and which has a flap drive 12. The exhaust-gas flap device 10 comprises a flap pipe 14 in which a flap plate denoted generally by 16 is supported, pivotably about a pivot axis A, on a pivot shaft 18. The flap plate 16 comprises two flap wings 20, 22 which, in the case of a flap plate 16 positioned in a shut-off position, lie against wing stops 24, 26 provided on the inner circumference of the flap pipe 14.

The pivot shaft 18 is, at its two axial end regions 28, 30, supported so as to be rotatable or pivotable relative to the flap pipe 14 about the pivot axis A. In its first axial end region 28, the pivot shaft 18 is coupled by a coupling unit 32 to a drive element 34 of the flap drive 12, for example a drive shaft, for conjoint rotation. In this region, the pivot shaft 18 may be coupled to the coupling unit 32 directly or via a component that is fixed to the pivot shaft for conjoint rotation therewith. The coupling unit 32 may for example comprise a flexible coupling element 36 which is formed from sheet-metal material and which forces the pivot shaft 18 and the drive element 34 axially apart from one another in the direction of the pivot axis A. The coupling element 36 may be coupled to the pivot shaft 18 and to the drive element 34 for example by positively locking engagement for conjoint rotation about the pivot axis A.

The pivot shaft 18 is, in its two axial end regions 28, 30, mounted rotatably about the pivot axis A by respective bearing assemblies 38, 40 on the flap pipe 14. The bearing assembly 38, which can be seen at the top in FIG. 1 and which is positioned relatively close to the pivoting drive 12, comprises a bearing bushing 42, which is provided on, for example fixed by welding to, the flap pipe 14. The first axial end region 28 of the pivot shaft 18 extends through the first bearing bushing 42 and projects axially beyond the latter, such that a rotational coupling projection 44 provided on the first axial end region 28 can engage into a corresponding rotational coupling recess of the coupling element 36. A rotational coupling projection 46 provided on the drive shaft, which acts as drive element 34, of the pivoting drive 12 engages correspondingly into a rotational coupling recess of the coupling element 36.

Provided in the first bearing assembly 38 is a first bearing bushing 42 wherein a first pivot bearing supports the pivot shaft 18 both radially with respect to the pivot axis A and axially in the direction of the pivot axis A. The first pivot bearing may for example be configured as a slide bearing and thus, even under the axial preload force for the pivot shaft 18 generated by the coupling element 36, ensures defined axial positioning of the latter in the flap pipe 14.

Figure 2:
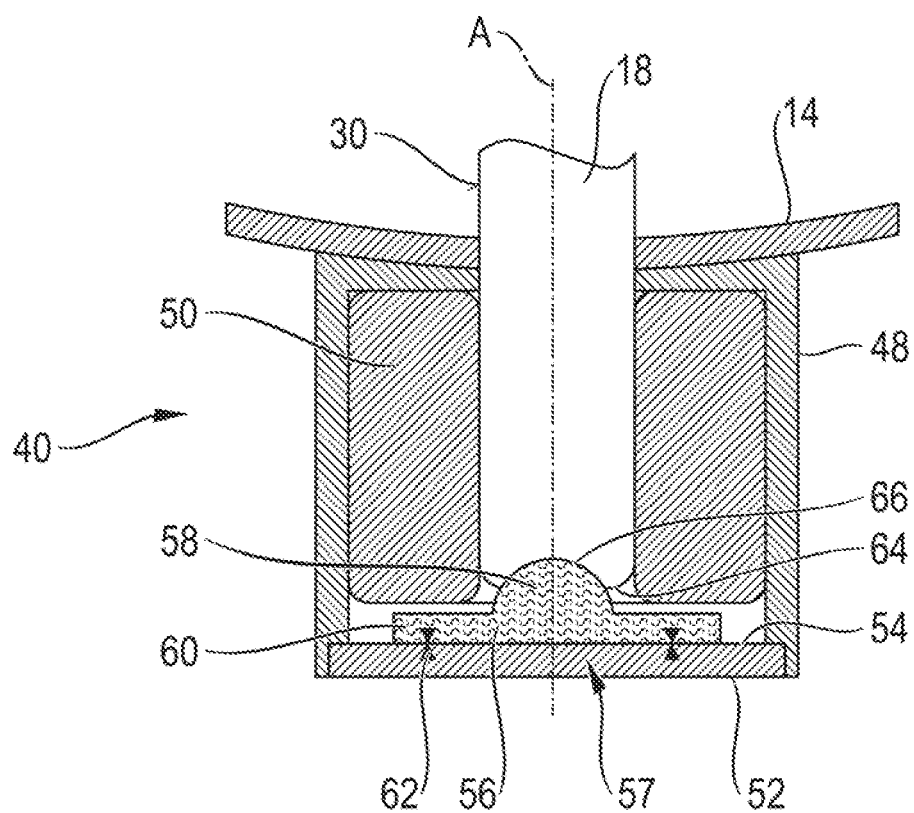
FIG. 2 shows a detail sectional view of a bearing region which bears a pivot shaft of the exhaust-gas flap device in an axial end region remote from a pivoting drive.

With its second axial end region 30, the pivot shaft 18 is mounted rotatably about the pivot axis A in the second bearing assembly 40, which is illustrated in detail in FIG. 2. The second bearing assembly 40 comprises a second bearing bushing 48, which may be attached to the flap pipe 14 for example by welding. The pivot shaft 18 extends into the second bearing bushing 48 through an opening provided in the flap pipe 14. Arranged in the second bearing bushing 48 is a second pivot bearing 50, via which the pivot shaft 18 is, in its second axial end region 30, supported radially with respect to the pivot axis A and thus rotatably mounted. There is no axial support or bearing action between the second axial end region 30 of the pivot shaft 18 and the second pivot bearing 50, such that over determinacy of the axial positioning of the pivot shaft 18 is avoided. The second pivot bearing 50 may also be configured for example as a plain or slide bearing.

At its end remote from the flap pipe 14, the second bearing bushing 48 is closed off by a bearing bushing base 52. The bearing bushing base 52, configured in the manner of a lid, can be inserted, for example pressed, into the axially open end of the second bearing bushing 48, and/or connected thereto in materially cohesive fashion, for example by welding.

Vibration-damping material 56 is arranged on the inner side 54, facing toward the second axial end region 30 of the pivot shaft 18, of the bearing bushing base 52. This vibration-damping material 56, which is preferably provided as an integral body, comprises, in a central region in relation to the pivot axis A, a vibration-damping material contact region 57 with a pivot shaft engagement region 58, and comprises a vibration-damping material fastening region 60 which preferably fully surrounds the vibration-damping material contact region 57 radially to the outside.

In the vibration-damping material fastening region 60 of plate-like form, the vibration-damping material 56 is, at a radial distance from the pivot shaft engagement region 58, fixed to the inner side 54 of the bearing bushing base 52 for example by a multiplicity of spot welds 62. This may be performed before the bearing bushing base 52 is attached to the bearing bushing 48.

The pivot shaft engagement region 58 which projects axially beyond the plate-like vibration-damping material fastening region 60 in the direction of the pivot shaft 18 is convexly domed, for example in the shape of a spherical cap, and engages into a vibration-damping material receiving recess 66 formed on an axial end face 64 of the pivot shaft 18. The vibration-damping material receiving recess 66 is of complementary shape with respect to the shaping of the pivot shaft engagement region 58, that is, is concavely domed.

With the pivot shaft engagement region 58, the vibration-damping material 56 is in contact with the second axial end region 30 of the pivot shaft 18. The vibration-damping material 56 is formed for example with wire material, preferably weft-knitted wire or the like, and thus has a basically porous, flexible structure, such that, during the attachment of the bearing bushing base 52, which already bears the vibration-damping material 56, to the second bearing bushing 48, the pivot shaft engagement region 58 is positioned so as to engage into the vibration-damping material receiving recess 66 and so as to bear under axial preload against the second axial end region 30 of the pivot shaft 18. Owing to this contact between the vibration-damping material 56 and the pivot shaft 18, the occurrence of vibrations during the rotation or pivoting of the pivot shaft 18 about the pivot axis A is suppressed, and the emission of sound to the outside is dampened or suppressed. Thus, no vibrations or excitations of vibration that could for example also be transmitted to the coupling element 36 constructed from sheet-metal material, and could be emitted therefrom to the outside in the form of sound, occur during the operation of the exhaust-gas flap device 10. Vibrations that are possibly transmitted to the exhaust-gas flap device 10 during operation can also be dampened in this way, and thus substantially do not lead to an emission of sound in the region of the exhaust-gas flap device 10.

In the case of the exhaust-gas flap device 10 constructed in accordance with the invention, as an alternative to the illustrated and above-described configuration, the contact between the pivot shaft 18 and the vibration-damping material 56 may also be achieved by virtue of the pivot shaft 18 engaging with its axial end, for example with a convex vibration-damping material engagement region, for example in the shape of a spherical cap, which projects axially on the end, into a complementary recess formed in the vibration-damping material 56. This recess may be present in the vibration-damping material 56 already before the contact with the pivot shaft 18 is established, though may for example also be formed as a result of the pressing of the pivot shaft 18 into the vibration-damping material 56. Here, in a configuration which is particularly easy to implement, the vibration-damping material 56 provided on or attached to the bearing bushing base 52 may be of plate-like form with substantially the same axial thickness over substantially its entire radial extent.

Figure 3:
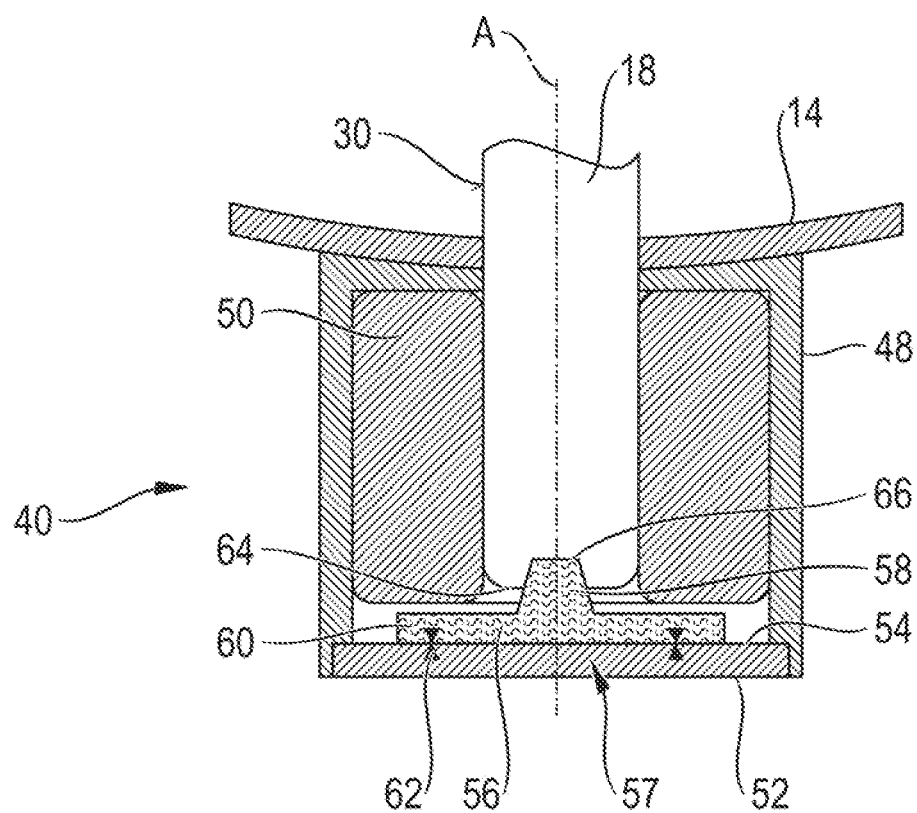
FIG. 3 is a schematic, corresponding to FIG. 2, of an alternative configuration; and, FIG. 4 is a further schematic, corresponding to FIG. 2, of an alternative configuration.

FIG. 3 shows an alternative configuration. In the case of the construction illustrated in FIG. 3, the pivot shaft engagement region 58 is of frustoconical shape. Correspondingly, the vibration-damping material receiving recess 66 in the pivot shaft 18 is of complementary frustoconical shape.

It is pointed out that a combination of the configurations illustrated in FIGS. 2 and 3 is for example also possible, such that, in the case of the frustoconical configuration illustrated in FIG. 3, the pivot shaft engagement region 58 ends at its upper end not in planar form but with the curvature illustrated in FIG. 2. Other shapings, for example a conical shaping of the pivot shaft engagement region 58, are also possible.

Figure 4:
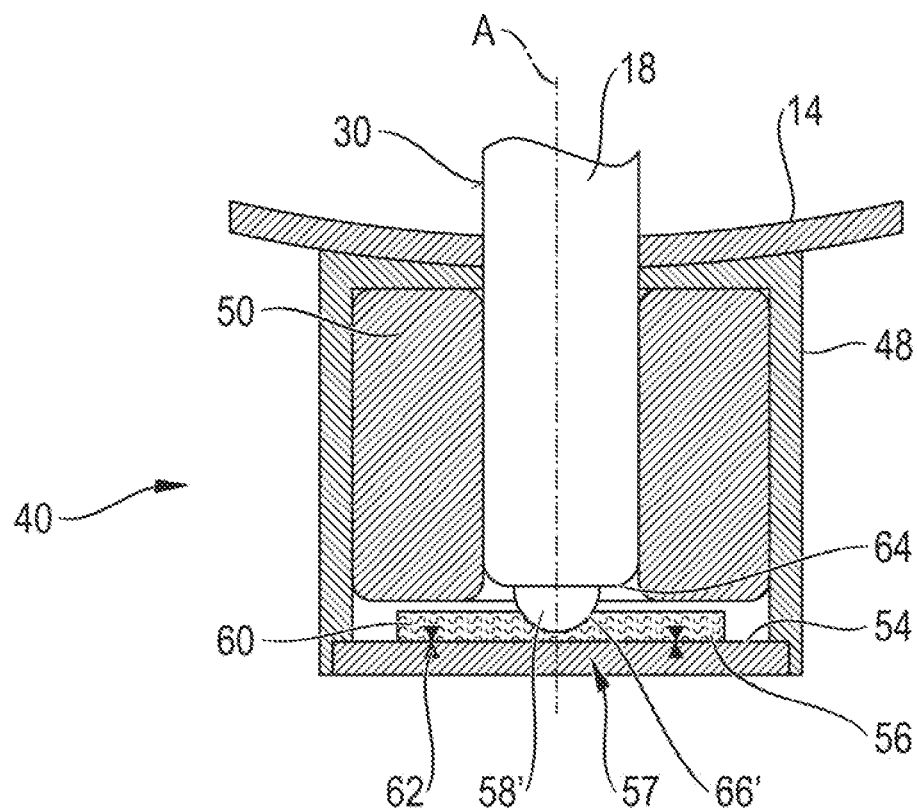

A further alternative configuration is illustrated in FIG. 4. In the case of this configuration, the vibration-damping material contact region 57 is formed with a concave, dome-like pivot shaft receiving recess 66', whereas, on the axial end face 64 of the pivot shaft 18, there is formed a convexly domed vibration-damping material engagement region 58', which engages into the pivot shaft receiving recess 66' of complementary shape. In particular in the case of the flexible configuration of the vibration-damping material 56, the pivot shaft receiving recess 66' may be formed entirely or else partially by virtue of the vibration-damping material engagement region 58' being pressed into the vibration-damping material 56.

Note that other shapings of the vibration-damping material engagement region 58' and of the pivot shaft receiving recess 66' are also possible in the configuration illustrated in FIG. 4. For example, it would also be possible for a frustoconical, a conical or a combined shaping of different geometries, for example a frustoconical and a dome-like geometry, to be provided.

It is understood that the foregoing description is that of the preferred embodiments of the invention and that various changes and modifications may be made thereto without departing from the spirit and scope of the invention as defined in the appended claims.

What is claimed is:

1. An exhaust-gas flap device, including for the exhaust-gas flow of a combustion engine, the exhaust-gas flap device comprising:

a flap pipe defining an interior;
a pivot shaft rotatably mounted so as to pivot about a pivot axis (A);
a flap plate supported in said interior on said pivot shaft;
said pivot shaft having first and second end regions;
first and second bearing assemblies for rotatably supporting said pivot shaft at corresponding ones of said first and second end regions on said flap pipe;
a pivot drive for said pivot shaft and said pivot drive including a drive element;
said pivot shaft being configured at said first end region for coupling to said drive element; and,
vibration-damping material supported with respect to said flap pipe so as to cause said pivot shaft to be in contact with said vibration-damping material at said second end region;
said second bearing assembly comprising a second bearing bushing having a base and being provided on said flap pipe and a second pivot bearing arranged in said second bearing bushing and bearing said pivot shaft radially with respect to said pivot axis (A), said vibration-damping material being arranged axially between said pivot shaft and said base of said second bearing bushing, said pivot shaft having an axial end face delimiting said second end region, said vibration-damping material defining a contact region in contact with said axial end face, said vibration-damping material having an attachment region whereat said vibration-damping material is attached to said base;
wherein one of:
said vibration-damping material contact region has a pivot shaft engagement region projecting axially in a direction toward said axial end face of said pivot shaft and said axial end face of said pivot shaft has a receiving recess formed therein receiving said pivot shaft engagement region therein; and,
said contact region of said vibration-damping material is configured to define a pivot shaft receiving recess and said axial end face of said pivot shaft is configured to define a vibration-damping material engagement region engaging into said pivot shaft receiving recess.

2. The exhaust-gas flap device of claim 1, wherein said attachment region of said vibration-damping material is configured so as to project radially outwardly with respect to said contact region of said vibration-damping material.

3. The exhaust-gas flap device of claim 1, wherein said attachment region of said vibration-damping material is configured so as to at least partially surround said contact region of said vibration-damping material radially to the outside.

4. The exhaust-gas flap device of claim 1, wherein said attachment region of said vibration-damping material is configured so as to project radially outwardly with respect to said contact region of said vibration-damping material; and, said attachment region of said vibration-damping material is further configured so as to at least partially surround said contact region of said vibration-damping material radially to the outside.

5. The exhaust-gas flap device of claim 1, wherein said attachment region of said vibration-damping material is configured to have a flat form.

6. The exhaust-gas flap device of claim 1, wherein said attachment region of said vibration-damping material is attached to said base of said bearing bushing via material cohesion.

7. The exhaust-gas flap device of claim 1, wherein said attachment region of said vibration-damping material is attached to said base of said bearing bushing via welding.

8. The exhaust-gas flap device of claim 1, wherein said pivot drive further includes a coupling unit for coupling said drive element to said pivot shaft for conjoint rotation about said pivot axis.

9. The exhaust-gas flap device of claim 1, wherein said second pivot bearing is a plain or slide bearing.

10. The exhaust-gas flap device of claim 1, wherein the vibration-damping material comprises porous material.

11. The exhaust-gas flap device of claim 10, wherein the vibration-damping material comprises open-pore material.

12. The exhaust-gas flap device of claim 1, wherein the vibration-damping material comprises wire material.

13. The exhaust-gas flap device of claim 12, wherein the wire material comprises weft-knitted wire, warp-knitted wire, braided wire, woven wire or tangled wire material.

14. The exhaust-gas flap device of claim 1, wherein, said vibration-damping material contact region has the pivot shaft engagement region projecting axially in the direction toward said axial end face of said pivot shaft and said axial end face of said pivot shaft has the receiving recess formed therein receiving said pivot shaft engagement region therein, and said pivot shaft engagement region is configured to have at least regionally a convexly domed or conical or frustoconical form; and, said receiving recess is of a complementary shape with respect to said pivot shaft engagement region.

15. The exhaust-gas flap device of claim 14, wherein the pivot shaft engagement region has a spherical-cap-shaped form.

16. The exhaust-gas flap device of claim 1, wherein, said contact region of said vibration-damping material is configured to define the pivot shaft receiving recess and said axial end face of said pivot shaft is configured to define the vibration-damping material engagement region engaging into said pivot shaft receiving recess, and said vibration-damping material engagement region is at least regionally of convex domed or conical or frustoconical form; and, said pivot shaft receiving recess is configured to have a form complementary to said vibration-damping material engagement region.

17. The exhaust-gas flap device of claim 16, wherein said vibration-damping material engagement region is configured to have a spherical-cap-shaped form.

18. The exhaust-gas flap device of claim 1, wherein said first bearing assembly includes a first bearing bushing provided on said flap pipe and a first pivot bearing arranged in said first bearing bushing and being configured to bear said pivot shaft radially and axially with respect to said pivot axis (A).

19. The exhaust-gas flap device of claim 18, wherein said first pivot bearing is a slide bearing.

20. An exhaust-gas flap device, including for the exhaust-gas flow of a combustion engine, the exhaust-gas flap device comprising:
a flap pipe defining an interior;
a pivot shaft rotatably mounted so as to pivot about a pivot axis (A);
a flap plate supported in said interior on said pivot shaft;
said pivot shaft having first and second end regions;
first and second bearing assemblies for rotatably supporting said pivot shaft at corresponding ones of said first and second end regions on said flap pipe;
a pivot drive for said pivot shaft and said pivot drive including a drive element;

said pivot shaft being configured at said first end region for coupling to said drive element; and, vibration-damping material supported with respect to said flap pipe so as to cause said pivot shaft to be in contact with said vibration-damping material at said second end region;

said second bearing assembly comprising a second bearing bushing having a base and being provided on said flap pipe and a second pivot bearing arranged in said second bearing bushing and bearing said pivot shaft radially with respect to said pivot axis (A), said vibration-damping material being arranged axially between said pivot shaft and said base of said second bearing bushing, said pivot shaft having an axial end face delimiting said second end region, said vibration-damping material defining a contact region in contact with said axial end face, said vibration-damping material having an attachment region whereat said vibration-damping material is attached to said base;

wherein one of:

said attachment region of said vibration-damping material is attached to said base of said bearing bushing via material cohesion; and, said attachment region of said vibration-damping material is attached to said base of said bearing bushing via welding.

* * * * *